United States Patent [19]
Hermanson

[11] Patent Number: 5,955,156
[45] Date of Patent: Sep. 21, 1999

[54] LIGHTED SCULPTURE WITH TRANSLUCENT, COLORED PANELS

[75] Inventor: Terry Hermanson, New York, N.Y.

[73] Assignee: Mr. Christmas Inc., New York, N.Y.

[21] Appl. No.: 08/947,324

[22] Filed: Oct. 8, 1997

[51] Int. Cl.⁶ ................................................. B44F 3/00
[52] U.S. Cl. ................................. 428/7; 40/550; 428/16
[58] Field of Search ........................... 428/7, 16; 40/550; 362/808

[56] References Cited

U.S. PATENT DOCUMENTS

| | | | |
|---|---|---|---|
| 2,486,636 | 11/1949 | Egle | 428/7 X |
| 5,375,043 | 12/1994 | Tokunaga | 362/31 |
| 5,379,202 | 1/1995 | Daun | 428/16 X |
| 5,534,315 | 7/1996 | Witte | 428/7 |
| 5,577,831 | 11/1996 | Chang | 428/16 X |

Primary Examiner—Henry F. Epstein
Attorney, Agent, or Firm—Fitzpatrick, Cella, Harper & Scinto

[57] ABSTRACT

A lighted display device includes a sculpted frame formed of thin wire or tubing. The frame outlines a character or an object and has one or more closed portions defined by the wire or tubing enclosing an area or partially enclosing an area. The display further includes a string of lights disposed along selected portions of the frame, and at least one translucent panel disposed in the closed portions or partially-closed portions of the frame.

34 Claims, 2 Drawing Sheets

LIGHTED SCULPTURE WITH TRANSLUCENT, COLORED PANELS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to a lighted display, and more particularly to a lighted sculpture depicting a character or object and having translucent, colored panels. For example, the sculpture can be shaped like a reindeer with colored panels within its antlers, nose, and hooves. In one embodiment, the sculpture is animated with at least one movable section.

2. Description of the Related Art

There are many known types of displays representing characters or objects. These displays can be lighted or unlighted and movable or stationary. For example, U.S. Pat. No. 2,486,636 relates to a decoration having two opposing faces, one of which is an illuminated face. The decoration is formed of a plastic body that can take any of various shapes including a star-shape. Rays of light pass radially from a centrally or eccentrically disposed lamp with negligible diffusion towards the opposed faces of the body. The lamp can have a clear or colored bulb. The peripheral edges of the body are beveled downwardly and inwardly from one of the faces so as to illuminate that face. The edges of the body are roughened, whereas both faces are smoothed to a high polish so that the roughened edges restrict flow of light rays beyond the edge and deflect them towards the desired face. Although the body is translucent, it is not disclosed as being colored. Therefore, there is no perception of color during daylight when the lamp is not lit. Moreover, because the lamp is disposed in the middle of the body, it detracts from the overall aesthetic appearance of the decoration when unlit.

U.S. Pat. No. 5,534,315 relates to a rigid, free-standing display formed of two parallel sheets of material. The display can be in the form of any character such as Santa Claus, a snowman, or a reindeer. Each of the parallel sheets has a plurality of holes positioned around its perimeter and outlining the profile of the character. A plurality of retainers are mounted through the holes in a locking relationship to secure the two sheets together. Each retainer can receive a lamp assembly of a string of decorative lamps, so as to illuminate the profile of the character. However, the material forming the sheets is not translucent and therefore can neither transmit ambient light during the daytime nor diffuse light from the string of bulbs when lit.

U.S. Pat. No. 5,577,831 relates to a decorative toy in the form of a rabbit. A frame of the toy is rabbit-shaped and has an upper transparent cover mounted thereon. The circumference of the frame is provided with a groove having a plurality of partitions and is filled with a translucent gem having a refractive property so as to form a translucent region around the circumference of the frame. A plurality of light-emitting diodes (LEDs) illuminate the translucent region so as to give the appearance of a neon lamp. However, the frame is also provided with a bottom cover that will prevent ambient light from effectively shining through when the toy is unlit.

U.S. Pat. No. 5,379,202 relates to an animated light display formed of a rigid wire frame covered with a plurality of light string sets. The string sets and the wire frame are surrounded by a sleeve made of a light-translucent material. However, because the frame only outlines the character and has a relatively thin diameter, during the daytime when the light string sets are not illuminated the features of the display are difficult to discern.

U.S. Pat. No. 5,375,043 relates to an indirect-type lighting unit that can be used for lighting interior walls or lighting a liquid crystal display device. The lighting unit includes a light guide plate that receives plural LEDs. The light guide plate is made of a transparent material such as acrylic resin or glass. However, one surface of the guide plate is a reflective surface, which is not conducive to transmitting ambient light.

As discussed above, the foregoing displays have certain limitations and drawbacks. An improved display having a simple design and being functional in daylight and darkness is desirable.

BRIEF SUMMARY OF THE INVENTION

It is a principal object of the present invention to provide a display that is effectively visible in both daylight and darkness or low-light conditions.

Another object of the invention is to provide a lighted display that accentuates the light from its light source.

In one aspect of the present invention, a lighted display device includes a sculpted frame outlining a character or an object, a series of lights disposed along the frame, and a translucent panel secured to the frame. At least a portion of the perimeter of the panel is outlined by at least a portion of the series of lights.

In another aspect of the present invention, a lighted display device includes a sculpted frame formed of thin wire or tubing, the frame outlining a character or an object and having at least one closed portion defined by the wire or tubing at least partially enclosing an area, a series of lights disposed along selected portions of the frame including the at least one closed portion, and at least one translucent panel disposed in the at least one closed portion of the frame such that at least a portion of the perimeter of the at least one translucent panel is outlined by the series of lights.

In yet another aspect of the present invention, a lighted display device includes a sculpted frame outlining a character or an object, light means disposed along the frame for illuminating the outline of the character or object, and transmitting means disposed on the frame and the light means for transmitting ambient light and transmitting, diffusing or reflecting light from the light means.

These and other objects, aspects, features and advantages of the present invention will become apparent from the following detailed description of the preferred embodiments taken in conjunction with the accompanying drawings.

DETAILED DESCRIPTION OF THE INVENTION

Figure 1:
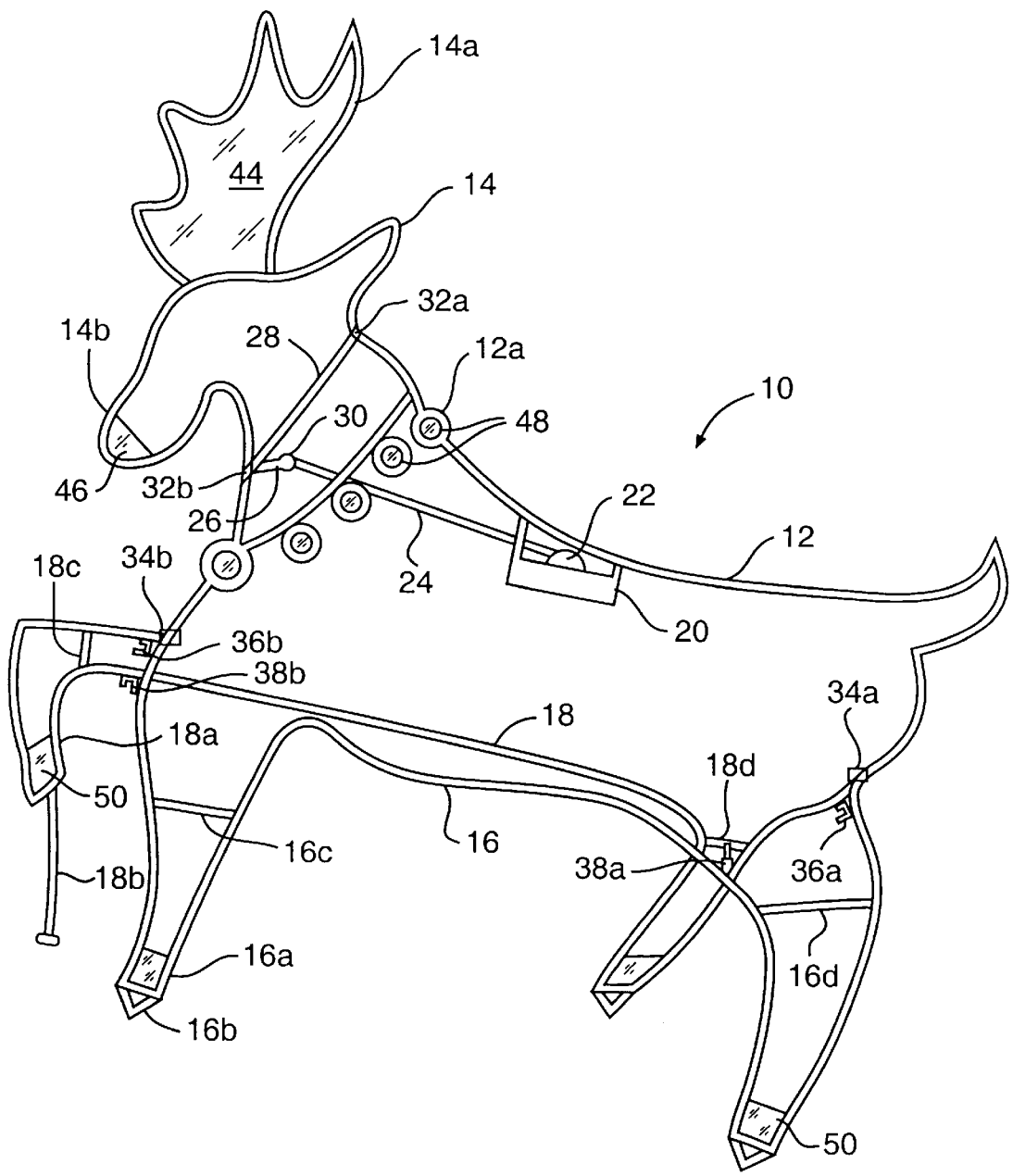
FIG. 1 is a perspective view of the display device of the present invention.

Referring to FIG. 1, reference numeral 10 generally identifies the animated light display of the preferred embodiment of the present invention.

Although the sculpted light display can be formed in any desired shape, in the illustrated embodiment a reindeer capable of wagging its head back and forth is shown. Other figures suitable for the present invention could be an animated Santa Claus figure, an animated snowman figure, or a holiday message, such as "Merry Christmas," with decorative ornaments. Of course, any other desired figure or object with or without moving parts can be depicted, including non-holiday decorations or advertising displays, without departing from the spirit or scope of the invention.

The display is comprised of four major components: a main frame or body 12, a head assembly 14, and two leg assemblies 16, 18. Each component is formed of metal rods or heavy gauge wire bent or sculpted into a desired shape.

The body 12 is shaped like the torso of a reindeer and can include ornamental features such as a collar and bells 12a. To the body 12 is pivotally attached the movable head assembly 14. The head assembly 14 is in the shape of a reindeer head including antlers 14a. The head assembly 14 is pivotally attached to the main body 12 through bearings 32a, 32b journaled onto stationary shaft 28, which is affixed to the main body 12. The shaft 28 can be disposed vertically or at an angle such that the head assembly 14 can swing back and forth about the shaft 28 relative to the main body 12. The bearings 32a, 32b can be affixed directly, as by welding, to the head assembly 14.

Each leg assembly 16, 18 is shaped like a foreleg and hindleg of a reindeer with hooves 16a, 18a. The first leg assembly 16 and the second leg assembly 18 are also attached to the main body 12 through hinges 34a, 34b. The hinges 34a, 34b can be of any design. Preferably, each of the hinges 34a, 34b comprises a pair of parallel, side-by-side collars with their axes disposed in a horizontal plane. The hinges can be secured to the main body 12 by welding. Two horizontally-disposed, opposite ends of each leg assembly 16, 18 can be journalled into a bearing collar of each hinge 34a, 34b so as to freely rotate therein about a horizontal axis. The hinges 34a, 34b are designed such that both of the leg assemblies 16, 18 can rotate almost 180° so that the display can be folded to a compact size for storage. In doing so, the leg assemblies 16, 18 are rotated in opposite, upward directions in FIG. 1. When folded for storage, the main body 12 is sandwiched by the leg assemblies 16, 18, with all of the main components disposed in substantially parallel planes.

The display is designed to be free-standing. Accordingly, when the display is unfolded it is necessary for the leg assemblies to be disposed at a predetermined angle relative to one another such that hooves of the leg assemblies are spaced on the ground or support surface. To accomplish this, a pair of U-shaped spacers 36a, 36b are fixed to one of the leg assemblies 16, 18. The other leg assembly will abut the spacers 36a, 36b when unfolded. The spacers 36a, 36b prevent the leg assemblies 16, 18 from approaching one another beyond the predetermined angle. A pair of latch assemblies 38a, 38b are provided on the leg assemblies 16, 18 to latch the leg assemblies at the predetermined angle when unfolded. Each latch assembly can take any suitable form, for example, a swingable latch hook secured to one leg assembly and a corresponding eyelet affixed to the other leg assembly.

Because the leg assemblies 16, 18 are formed with free ends, a plurality of braces 16c, 16d, 18c, 18d are provided at appropriate locations for structural stability. In addition, because four-point contact with the ground is desired, if one leg assembly is sculpted with a raised foreleg, as shown in FIG. 1, a leg extension 18b can be provided. Also, pointed anchor hoops 16b can be provided to anchor the display to a surface. Not only can the pointed hoops dig into the ground, but also stakes driven into the ground can hook onto the anchor hoops 16b for more secure anchoring.

In order to effect motion of the reindeer head assembly 14, a rotary motor 22 is mounted on a motor bracket 20, which is affixed to the main body 12. An unshown drive plate or disk is secured to the rotational drive axis of the motor 22 and an eccentrically-positioned coupling is secured thereon. Rotational motion of the disk is translated into oscillating motion of the head by a drive link 24. The drive link 24 has one end secured to the eccentrically-positioned coupling of the drive disk and the other end connected to a driven arm 26 of the head assembly 14. The driven arm 26 is formed integrally with the bearing 32b of the head assembly 14. As the motor 22 drives its drive disk to rotate the one end of the drive link 24, the second end of drive link 24 drives the driven arm 26 back and forth to rotate the bearing 32b in an oscillating fashion about the shaft 28. Since the head assembly 14 is integral with the bearing 32b, the head assembly 14 will oscillate back and forth about the shaft 28.

Figure 3:
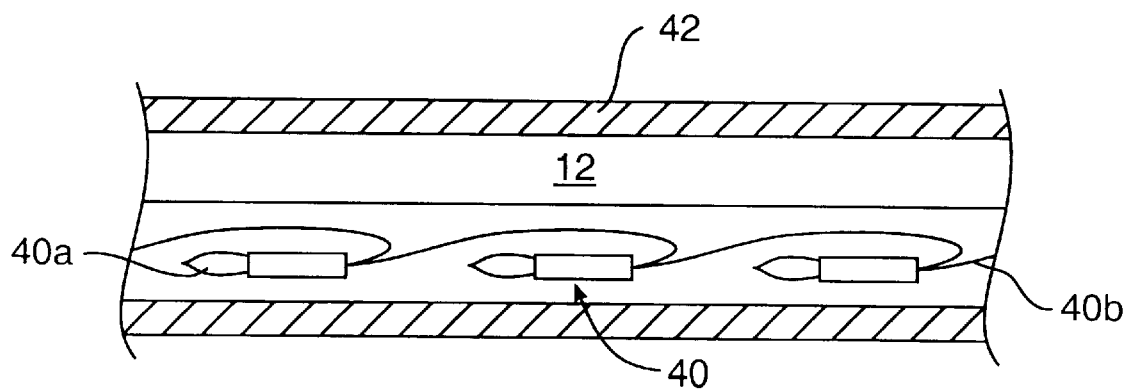
FIG. 3 is a cross-sectional view of a portion of the display device of the present invention.

The display is preferably illuminated in the following manner. Connected to the power source for the motor 22 is a string of lights 40 comprising individual bulbs 40a connected by wiring 40b, as shown in FIG. 3. Both the motor 22 and the string of lights 40 can operate on standard U.S. power (120 V AC, 60 Hz) utilizing conventional circuitry. In this embodiment, the string of lights 40 is strung along the display portions of the display figure 10. That is, lights are not strung on the entire main body 12, head assembly 14, and leg assemblies 16, 18, but only those portions that are intended to form a part of the animated figure. For example, only those portions of the main body 12 that form the outline of the reindeer and certain details, such as its collar and bells 12a, as well as those portions outlining the head assembly 14 and the leg assemblies 16, 18, are illuminated.

Structural and functional members, such as motor bracket 20, driving link 24, shaft 28, leg extension 18b and the various structural braces 16c, 16d, 18c, 18d are not illuminated. In this manner, in low light conditions, such as nighttime, only the display portions of the animated display will be readily visible to an observer.

The lights 40 are preferably in the form of a single strand, but can be formed of plural strands for different parts of the figure. After the string of lights 40 is strung along the display portions of the figure, these display portions are preferably wrapped with flexible tube-like members or sheathing 42 formed of a translucent material, which is preferably multi-colored. As to the preferred colors, in the illustrated example, white or clear translucent tubular members can be used for portions of the figure corresponding to the reindeer's main body, head and legs, red tubular members can be used for portions of the figure corresponding to the reindeer's nose, collar and hooves, and yellow tubular members can be used for the reindeer's antlers and bells. The translucent tubular members 42 are each formed with a longitudinal slit to readily permit wrapping the tubular members 42 around the wire forming the main body 12, head assembly 14, and leg assemblies 16, 18. The slit can optionally be formed spirally. The tubular members 42 can be held to the wire forming the main body, head and legs by wire ties or other suitable means.

The slit in the translucent tubular member 42 also enables individual bulbs 40a to be replaced when they burn out. The lights 40 can be of a type that are constantly illuminated or a type that flash intermittently optionally, the lights can be colored to correspond to the preferred colors of the display and in such case only clear tubular members 42 need be used. Also, both colored lights and colored tubular members can be used to enhance the perceived colors.

The metal parts of the main body 12, head assembly 14, and leg assemblies 16, 18, etc., are preferably coated with a non-conducting material, such as an epoxy, to protect against electric shock and protect the metal from corrosion.

An important aspect of the present invention is the provision of translucent panels at selected areas of the figure. In the illustrated embodiment, one translucent panel 44 is provided for the antlers 14a of the head assembly 14, another panel 46 for the nose section 14b of the head assembly 14, plural panels 48 for the string of bells 12a of the main body 12, and plural panels 50 for the hoof sections 16a, 18a of the leg assemblies 16, 18. The translucent panels 44, 46, 48, 50 are preferably formed of a flexible yet rigid plastic that can maintain its shape when not subjected to any forces other than its own weight. This plastic is preferably more rigid than the material used for the tubular members 42.

The translucent panels 44, 46, 48, 50 are preferably positioned in areas that are mostly surrounded by the wire frame. This can include completely closed areas such as the antler section 14a and the individual bell sections 12a, or partially-closed areas such as nose section 14b and hoof sections 16a, 18a. Each panel is preferably of a color identical to that of the tubular member 42 or lights 40 outlining it. For example, in the illustrated embodiment, since the tubular member 42 and lights 40 forming the antler section 14a of the head assembly 14 are preferably yellow, then the panel 44 is also preferably the same yellow color. Likewise, the panel 46 of the nose section 14b is preferably red, the panels 48 of the bell sections 12a, yellow, and the panels 50 of the hoof sections 16a, 18a, red.

Figure 2:
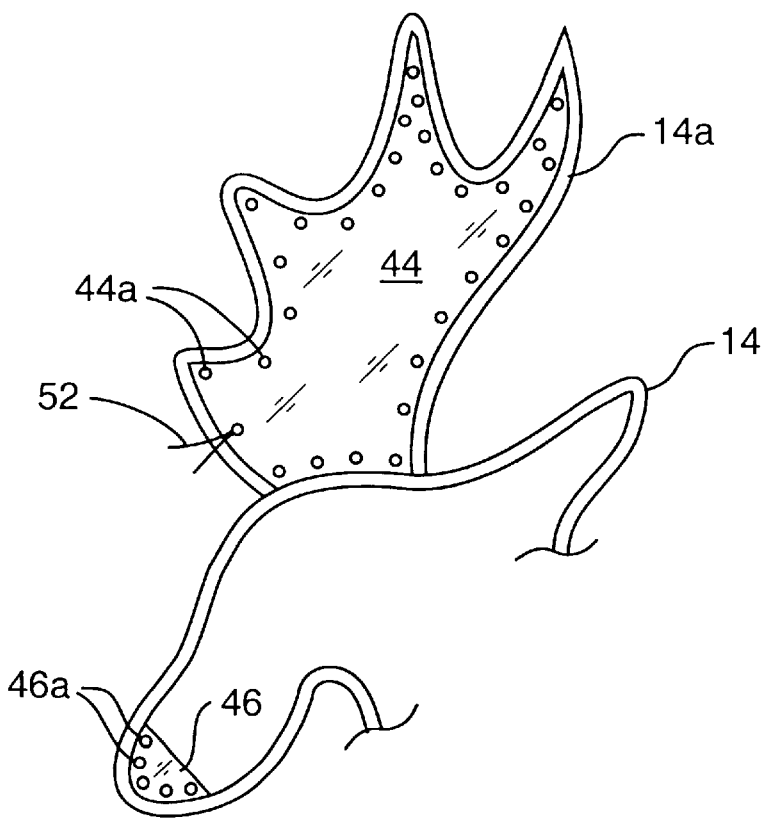
FIG. 2 is an enlarged view of a portion of the display device of the present invention.

A plurality of perforations are formed in at least a portion of the perimeter of each translucent panel 44, 46, 48, 50. As shown in FIG. 2, a series of perforations 44a are formed in the entire perimeter of panel 44 of the antler section 14a because panel 44 is completely surrounded or outlined by the antler section 14a. On the other hand, perforations 46a are formed in only a portion of the perimeter of panel 46. The perforations 46a are adjacent to the wire of the nose section 14b. A plurality of wire ties 52 can be inserted through the perforations and wrapped around the adjacent wire of the frame. Any other suitable means can be used to secure the panels, such as a continuous line or thread, first threaded through one perforation, around the wire frame and then through the next perforation and around the wire frame and so on.

Because the panels 44, 46, 48, 50 are colored and translucent, in the daytime when the string of lights 40 may not be effective, details of the character can nevertheless be discerned. That is, ambient light can shine through the translucent panels to make them readily visible, with the transmitted light being of the intended color. Because the wire frame, lights 40 and wire ties 52 are disposed around the perimeters of the translucent panels, they do not interfere with the transmitted image, but rather emphasize the outlines of the panels.

Preferably, each translucent panel is formed of such a material and thickness so as to accentuate the light emanating from the string of lights 40 at nighttime and other low-light conditions. Preferably, the material and thickness can be selected to reflect, refract or otherwise diffuse the light emanating from the light bulbs 40a of the string of lights 40 surrounding the panels. Many common plastics can achieve this effect.

Although specific embodiments of the present invention have been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

I claim:

1. A lighted display device comprising:
   a sculpted frame outlining a character or an object;
   a series of lights disposed along said frame; and
   a translucent panel secured to said frame, at least a portion of the perimeter of said panel being outlined by at least a portion of said series of lights.

2. A lighted display device according to claim 1, wherein said translucent panel is colored.

3. A lighted display device according to claim 1, further comprising a translucent sheath surrounding said series of lights.

4. A lighted display device according to claim 3, wherein said panel is the same color as said sheath surrounding said series of lights outlining the perimeter of said panel.

5. A lighted display device according to claim 3, wherein said sheath is formed of thin plastic.

6. A lighted display device according to claim 1, wherein said panel is formed of thin plastic.

7. A lighted display device according to claim 1, wherein a first section of said frame is pivotably movable relative to a second section of said frame.

8. A lighted display device according to claim 7, wherein said first section of said frame is hinged to said second section of said frame and is moved through a linkage driven by a motor supported on said second section of said frame.

9. A lighted display device according to claim 1, wherein said frame is hinged so as to be collapsible.

10. A lighted display device according to claim 1, further comprising means for securing said panel to said frame.

11. A lighted display device according to claim 10, wherein a series of holes is formed in said at least one panel to accommodate said securing means.

12. A lighted display device according to claim 10, wherein said securing means comprises a plurality of wire ties.

13. A lighted display device comprising:
    a sculpted frame formed of thin wire or tubing, said frame outlining a character or an object and having at least one closed portion defined by said wire or tubing at least partially enclosing an area;
    a series of lights disposed along selected portions of said frame including the at least one closed portion; and
    at least one translucent panel disposed in the at least one closed portion of said frame such that at least a portion of the perimeter of the at least one translucent panel is outlined by said series of lights.

14. A lighted display device according to claim 13, wherein said at least one translucent panel is colored.

15. A lighted display device according to claim 13, further comprising a translucent sheath surrounding said series of lights.

16. A lighted display device according to claim 15, wherein said at least one panel is the same color as said sheath surrounding said series of lights outlining the perimeter of said panel.

17. A lighted display device according to claim 15, wherein said sheath is formed of thin plastic.

18. A lighted display device according to claim 13, wherein said panel is formed of thin plastic.

19. A lighted display device according to claim 13, wherein a first section of said frame is pivotably movable relative to a second section of said frame.

20. A lighted display device according to claim 19, wherein said first section of said frame is hinged to said second section of said frame and is moved through a linkage driven by a motor supported on said second section of said frame.

21. A lighted display device according to claim 13, wherein said frame is hinged so as to be collapsible.

22. A lighted display device according to claim 13, further comprising means for securing said at least one panel to said frame.

23. A lighted display device according to claim 22, wherein a series of holes is formed in said at least one panel to accommodate said securing means.

24. A lighted display device according to claim 22, wherein said securing means comprises a plurality of wire ties.

25. A lighted display device comprising:

a sculpted frame outlining a character or an object;

light means disposed along said frame for illuminating the outline of the character or object; and transmitting means disposed on said frame and said light means for transmitting ambient light and transmitting, diffusing or reflecting light from said light means.

26. A lighted display device according to claim 25, wherein said transmitting means is colored.

27. A lighted display device according to claim 25, further comprising a translucent sheath surrounding said lights means.

28. A lighted display device according to claim 27, wherein said sheath surrounds said light means and said transmitting means is the same color as said sheath surrounding said light means.

29. A lighted display device according to claim 27, wherein said sheath is formed of thin plastic.

30. A lighted display device according to claim 25, wherein said transmitting means is formed of thin plastic.

31. A lighted display device according to claim 25, wherein a first section of said frame is pivotably movable relative to a second section of said frame.

32. A lighted display device according to claim 31, wherein said first section of said frame is hinged to said second section of said frame and is moved by driving means.

33. A lighted display device according to claim 25, wherein said frame is hinged so as to be collapsible.

34. A lighted display device according to claim 25, further comprising means for securing said transmitting means to said frame.

* * * * *